No. 811,819. PATENTED FEB. 6, 1906.
W. H. BRISTOL.
THERMO ELECTRIC COUPLE.
APPLICATION FILED JUNE 30, 1905.
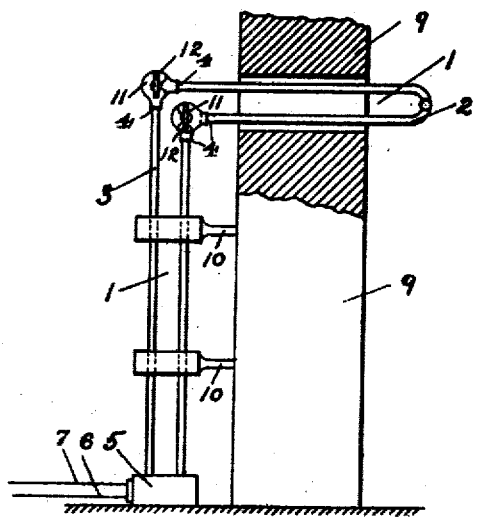
Fig. 1.
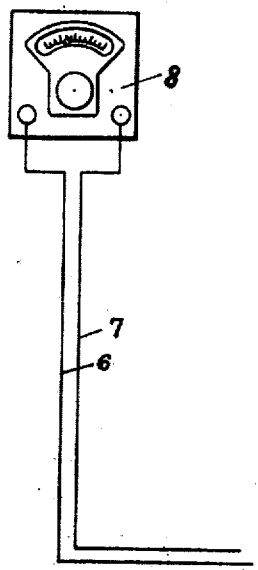
Fig. 2. Fig. 3.
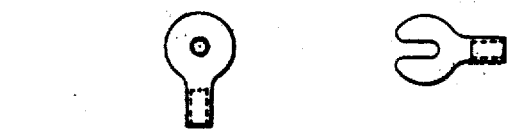
Fig. 4. Fig. 5.
Witnesses
William H. Bristol Inventor
By his Attorney

UNITED STATES PATENT OFFICE.

WILLIAM H. BRISTOL, OF NEW YORK, N. Y.

THERMO-ELECTRIC COUPLE.

No. 811,819.

Specification of Letters Patent.

Patented Feb. 6, 1906.

Application filed June 30, 1905. Serial No. 267,834.

*To all whom it may concern:*

Be it known that I, WILLIAM H. BRISTOL, a citizen of the United States, and a resident of New York city, in the county of New York and State of New York, have invented a certain new and useful Improvement in Thermo-Electric Couples, of which the following is a specification.

My invention relates to thermo-electric couples, and has for its particular object to construct a couple in such a manner that it may be readily and quickly installed and that the active portion may be renewed or removed without disturbing the remainder of the couple and apparatus.

For this purpose my invention consists, essentially, of a sectional or separable couple comprising a primary section and a secondary section and means adapted to firmly connect said sections so as to form, in effect, one continuous couple.

My invention will best be understood when described in connection with the accompanying drawings, in which—

Figure 1 is a diagrammatic view illustrating my invention. Figs. 2 to 5 are detail views of the connecting means.

The ordinary form of thermo-electric couples comprises two elements, a positive and a negative element, united at one end, forming the so-called "hot" or active end of the couple, the outer or cold ends being the terminals of the couple and the point to which the leads or other wires are connected. In case of injury to the couple, such as the burning out of the hot ends, it is necessary to replace the entire couple by a new one, which is a comparatively expensive operation. Furthermore, the ordinary couple can be set up only temporarily and then is usually so placed that the cold ends are subjected to direct radiation from the furnace and the like and the couple is frequently in the way of the attendant.

It is the object of the present invention to obviate this difficulty and make the outer portion of the couple a permanent installation capable of being located so as not to interfere with other operation as well as to allow of the quick replacement of the active part should this be burned out or meet with an accident without disturbing the rest of the couple and apparatus. In carrying out my invention I provide a thermo-electric couple 1, composed of two separable sections, a primary or active section 2 and a secondary section 3, the broken terminals 4 of which are adapted to be connected when the couple is in use. The cold ends of the couple 1—that is, the outer ends of the secondary section 3— are connected to the socket 5, which may contain a suitable compensating means, such as the means illustrated in my prior patent, No. 783,503. Into this socket fits an ordinary plug carrying the leads 6 and 7, which are connected to a suitable indicating or recording device 8. By making the couple 1 separable the secondary section 3 may be permanently attached to the furnace-wall 9, as by the brackets 10, so that the primary section may be inserted and connected when required or if injured or burned out may be quickly replaced by a new one. The broken ends 4 of the primary and secondary-sections are for this purpose connected by means such as an open slot-joint 11 and winged nut 12, as shown. The ends of the couples are fused or soldered to the terminal pieces, which are all made of the same metal to neutralize any secondary thermo-electric effects and are preferably of copper to insure a non-corrosive and good contact-surface. This form of connection is very simple and effective and also provides a guard against the incorrect connection of the elements of the two sections, it being manifestly impossible to connect incorrectly after the terminal pieces have once been properly fused or soldered to the elements of the couple. I do not wish, however, to be understood as implying that it is necessary to employ such terminal pieces or such form of connection, as any form of connection producing a thorough contact will suffice. In fact, the terminal pieces may be omitted entirely and the broken terminals of the sections flattened, punched, and bolted together.

By thus making the couple separable in dividing it into two sections I am enabled to greatly reduce the cost of renewals, it being necessary to renew only the primary section in case of burning out or other accidents to the active portion of the couple.

I am further enabled to facilitate the installation of the couple and to provide for a permanent installation of a part of the apparatus.

The feature of being able to remove the active part of the couple at will is especially valuable in cases where it is not desirable to have the couple inserted into the furnace or bath until the latter is ready because of danger of breakage or other possible injury to the couple in charging or discharging the furnace, &c.

What I claim as my invention, and desire to secure by Letters Patent, is—

1. A thermo-electric couple being separable or capable of division between its hot and cold ends.

2. A sectional or separable thermo-electric couple provided with connecting means between the hot and cold ends.

3. A thermo-electric couple comprising a primary section and a secondary section and means adapted to connect said primary and secondary sections between the hot and cold ends of the couple.

4. A thermo-electric couple comprising a primary section and a secondary section, and an open slotted joint adapted to connect the primary and secondary sections between the hot and cold ends of the couple.

5. The combination with an indicating device or recording instrument, of a sectional or separable thermo-electric couple provided with connecting means between the hot and cold ends.

6. The combination with an indicating or recording instrument, of a thermo-electric couple comprising a primary section and a secondary section and means adapted to connect said primary and secondary sections between the hot and cold ends of the couple.

Signed at New York, in the county of New York and State of New York, this 29th day of June, A. D. 1905.

WILLIAM H. BRISTOL.

Witnesses:
FREDK. F. SCHUETZ,
RAENA A. YUDISKY.